US006289757B1

United States Patent
Hennequet et al.

(10) Patent No.: US 6,289,757 B1
(45) Date of Patent: Sep. 18, 2001

(54) SYNCHRONIZED GEARBOX

(75) Inventors: Gonzalo-Antoine Hennequet, Rueil Malmaison; Jean-Michel Lamy, Paris, both of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/462,072

(22) PCT Filed: Apr. 30, 1999

(86) PCT No.: PCT/FR99/01035

§ 371 Date: Mar. 28, 2000

§ 102(e) Date: Mar. 28, 2000

(87) PCT Pub. No.: WO99/57459

PCT Pub. Date: Nov. 11, 1999

(30) Foreign Application Priority Data

May 5, 1998 (FR) .................................................. 98/05674

(51) Int. Cl.[7] ....................................................... F16H 3/38
(52) U.S. Cl. ................... 74/340; 74/333; 74/339; 192/18 R; 192/66.2
(58) Field of Search .......................... 74/339, 340, 333; 191/66.2, 18 R, 18 A, 18 B

(56) References Cited

U.S. PATENT DOCUMENTS

| 805,978 | * | 11/1905 | Menges | ............................. | 74/339 X |
|---|---|---|---|---|---|
| 858,764 | * | 7/1907 | Sears | ................................ | 74/339 X |
| 860,649 | * | 7/1907 | Fletcher | ............................. | 74/333 X |
| 984,523 | * | 2/1911 | Baer | ................................... | 192/66.2 |
| 1,737,451 | * | 11/1929 | Clark | ................................ | 74/339 |
| 1,771,295 | * | 7/1930 | Brice | ................................ | 74/339 |
| 1,866,270 | * | 7/1932 | Schoonmarker | .................... | 192/53.1 |
| 3,116,649 | * | 1/1964 | Wickman | ....................... | 192/18 R X |
| 3,174,349 | * | 3/1965 | Renker et al. | ..................... | 74/339 X |
| 3,364,795 | * | 1/1968 | Castelet | ............................. | 74/339 X |
| 3,834,499 | * | 9/1974 | Candellero et al. | ............... | 74/339 X |
| 4,192,410 | * | 3/1980 | Poirier | ................................ | 74/339 X |
| 4,344,335 | * | 8/1982 | Kawai | ................................ | 74/339 X |
| 5,392,665 | * | 2/1995 | Muller | ................................ | 74/333 X |

* cited by examiner

Primary Examiner—Charles A Marmor
Assistant Examiner—Ha Ho
(74) Attorney, Agent, or Firm—Oblon, Spivak, McClelland, Maier & Neustadt, P.C.

(57) ABSTRACT

A motor vehicle gearbox which includes at least two parallel primary and secondary shafts, respectively connected in rotation to an engine, and through a main transmission, to a wheel. The primary shaft bears a first idler gear to a second stationary pinion borne by the secondary shaft. The first idler is capable of being jaw clutched on the primary shaft for transmitting engine power to the wheel. A self-disengaging control selectively accelerates or brakes the primary shaft which bears the idler so as to synchronize them before linking them in rotation. A self-disengaging accelerator accelerates the primary shaft if its speed is less than that of the idler, and a self-disengaging brake brakes the primary shaft if its speed is greater than that of the idler.

6 Claims, 3 Drawing Sheets

SYNCHRONIZED GEARBOX

BACKGROUND OF THE INVENTION

Field of the Invention

The invention relates to a motor vehicle gearbox.

The invention relates more particularly to a motor vehicle gearbox of the type which is provided with at least two parallel shafts, the primary and secondary, respectively linked in rotation to a vehicle engine and, via a transmission, to at least one vehicle wheel, and of the type in which one of the shafts supports at least one first idler pinion engaging with a second fixed pinion supported by the other shaft, the first pinion being capable of being linked in rotation to the shaft which supports it to transmit motive power from the engine to the vehicle wheel.

DISCUSSION OF THE BACKGROUND

There are known numerous gearboxes which permit the establishment of various gear reduction ratios by interlocking of idler pinions on their shafts.

In the case, for example, of a gearbox with two parallel shafts, when a user initiates the change from a first gear reduction ratio to a second gear reduction ratio by means of a gear shift lever, the first idler pinion corresponding to the first ratio is "released" from the first shaft supporting it before the second idler pinion corresponding to the second ratio is in turn interlocked on the first shaft. Since the operation is extremely fast, the first shaft continues to turn at a speed close to that which it had when the first idler pinion was interlocked thereon. The second idler pinion, which for its part is driven by a second fixed pinion of the other shaft with which it is engaged, turns at a speed substantially different from that of the first shaft by virtue of a different gear reduction ratio.

To ensure that it can be interlocked on the first shaft, the second idler pinion must be brought beforehand to a speed of rotation substantially equal to that of the first shaft.

This is the function conventionally assigned to devices known as synchronizers.

Each idler pinion is coupled to an axially declutchable device, generally operated by an axially movable band driven by the displacement of an operating fork parallel to the shaft supporting the idler pinion.

Once clutched, the device permits the idler pinion to be frictionally in rotation to its shaft in such a way that it progressively leads to an adequate speed of rotation without transmitting a large torque at the same time.

In a second step (the pinion and shaft turning at the same speed), the device then permits the idler pinion to be linked to the shaft by means, for example, of a toothed coupling, thus establishing a gear reduction ratio of the gearbox.

Such a device is advantageous in that interlocking of the idler pinions on their shafts can be facilitated thereby. In fact, since the majority of interlocking devices are provided with toothed couplings, it is important that the idler pinions be synchronized beforehand with their shaft(s) before being interlocked, in order to limit tooth wear and to guarantee noiseless operation of the interlocking device.

On the other hand, the devices provided with synchronizers have the disadvantage of using a synchronizer based on idler pinions, thus considerably increasing the axial space requirement and weight of the gearbox.

In addition, in the case of a so-called robotized gearbox, or in other words a gearbox in which the different members are shifted by pilot-controlled actuators, these actuators being operated by an electronic control unit on which the vehicle operator acts, the use of synchronizers is particularly difficult. In fact, compared with a conventional operating system with selection fingers and forks, operation of the synchronizers by actuators is particularly inappropriate, since the actuators occupy considerable space.

SUMMARY OF THE INVENTION

To remedy these disadvantages, the method according to the invention no longer comprises bringing the pinion to be interlocked to a speed close to that of the shaft on which it must be interlocked, but instead comprises bringing the shaft on which it must be interlocked to a speed close to that of the pinion to be interlocked.

With this objective the invention proposes a gearbox of the type described hereinabove, characterized in that it is provided with controlled declutchable means permitting the primary shaft to be accelerated or braked selectively in order to synchronize the speed of the idler pinion with that of the shaft supporting it before linking it in rotation to the said shaft, and being capable of accelerating the primary shaft as long as its speed is lower than that of the idler pinion and of braking the primary shaft as long as its speed is higher than that of the idler pinion.

According to other characteristics of the invention:

- the declutchable means for accelerating the primary shaft are provided with means for temporarily linking the primary shaft in slipping rotation to the secondary shaft;
- the means for linking the primary shaft in rotation to the secondary shaft are provided with a first toothed gear coaxial with the primary shaft, which gear engages with a second toothed gear supported by the secondary shaft and linked in rotation thereto, the second gear being capable of being temporarily linked in rotation to the primary shaft via a slipping device for coupling of acceleration;
- the controlled declutchable means for braking the primary shaft are provided with means for temporarily linking the primary shaft in slipping rotation with the gearbox case;
- the means for linking the primary shaft in rotation to the gearbox case are provided with a fixed frustoconical bearing surface of the gearbox case, coaxial with the primary shaft, to which the primary shaft can be linked temporarily via a slipping device for coupling of braking;
- the slipping devices for coupling of acceleration and of braking are provided with a common contact wheel, which is linked in rotation to the primary shaft by splines, which is provided with two oppositely disposed annular frustoconical bearing surfaces, and which is capable of being driven slidingly along the primary shaft toward a first active extreme axial position in which a first annular frustoconical bearing surface cooperates by friction with a complementary annular frustoconical bearing surface of the said first toothed gear, to accelerate the primary shaft, or toward a second, opposite active extreme axial position in which a second annular frustoconical bearing surface cooperates by friction with the fixed, annular and complementary frustoconical bearing surface of the gearbox case, to brake the primary shaft, by passing through an indexed intermediate axial rest position;

the annular bearing surfaces are frustoconical;

the annular frustoconical bearing surfaces are plane, and the contact wheel is a clutch disk covered with a friction lining material;

the slipping devices for coupling of acceleration and coupling of braking comprise an electromagnetic clutch, in which two radial cages coaxial with the primary shaft, supported respectively by the first toothed gear and by the fixed frustoconical bearing surface of the gearbox case, are capable of cooperating selectively in slipping manner with two ends of a rotor in two portions integral with the primary shaft to accelerate or brake respectively the primary shaft when a magnetic flux is established between a rotor portion and a clutch cage;

the electromagnetic clutch is a metal-powder clutch;

the gearbox is provided with a motorized pump, in which a fixed case supporting axial pistons is integral with the gearbox case, in which a control plate is linked in rotation to the primary shaft of the gearbox, and which is capable of operating selectively as a hydraulic motor or hydraulic pump to accelerate or brake respectively the primary shaft;

the gearbox is a robotized gearbox which is provided with automated control means acting on the declutchable means for acceleration and braking of the primary shaft, and automated means for interlocking the idler pinions on the shafts supporting them.

BRIEF DESCRIPTION OF THE DRAWINGS

Other characteristics and advantages of the invention will become clear from reading the detailed description hereinafter, which will be understood by referring to the attached drawings, wherein.

DESCRIPTION OF THE PREFERRED EMBODIMENTS

Figure 1:
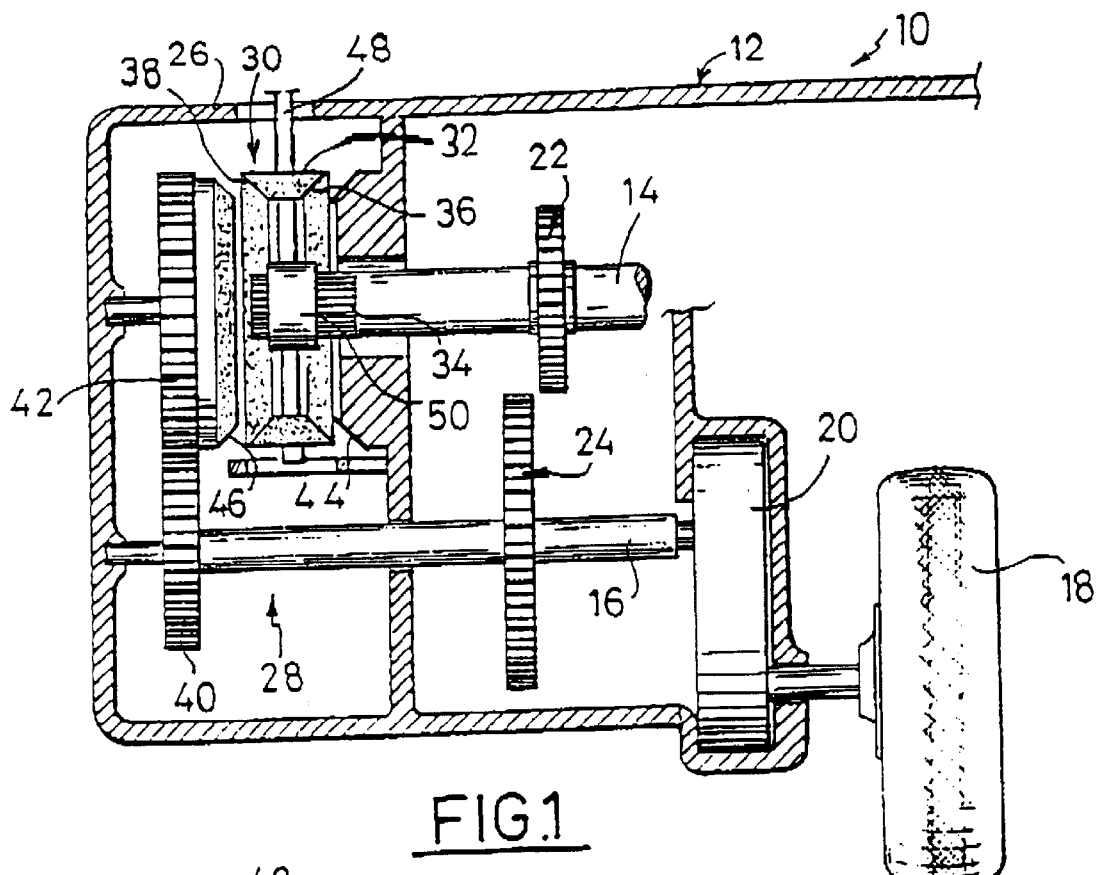
FIG. 1 is a schematic view in section through a longitudinal central plane passing through the axes of the two shafts of a gearbox constructed according to the invention, provided with a noninterlocked idler pinion and a coupling device with contact wheel, illustrated in a rest mode.

Throughout the description, identical reference numbers denote identical or similar elements.

In known manner, a gearbox 10 is provided with a case 12 which supports in rotation two longitudinal parallel shafts, the primary 14 and the secondary 16. Primary shaft 14 receives motive power from an engine (not illustrated) of the vehicle, while secondary shaft 16 is capable of transmitting the motive power to at least one wheel 18 of the vehicle via a transmission 20. An idler pinion 22 supported by primary shaft 14 is capable of being interlocked with a fixed pinion 24 of the secondary shaft to transmit the motive power from primary shaft 14 to secondary shaft 16. Gearbox case 12 is provided with case end 26, which is provided with controlled declutchable means 28 for acceleration or braking of primary shaft 14.

According to a first embodiment, controlled declutchable means 28 are provided with a toothed gear 40 integral in rotation with one end of secondary shaft 16, the said gear engaging with a toothed gear 42, which is supported in rotation by end 26 of gearbox case 12 and which is coaxial with primary shaft 14. Toothed gears 40 and 42 are permanently engaged, and so toothed gear 42 is indirectly driven in rotation by wheel 18 of the vehicle.

Controlled declutchable means 28 are also provided with a coupling device 30, in which a contact wheel 32, provided with a hub 50, is linked in rotation to the primary shaft by splines 34. Contact wheel, 32 is capable of being driven slidingly along the primary shaft, and is provided on two oppositely disposed faces with a first annular frustoconical bearing surface 36 and a second annular frustoconical bearing surface 38. An axial sliding gear wheel 48 cooperating with a hub 50 of contact wheel 36 permits its axial sliding movements along splines 34 of primary shaft 14 to be controlled.

Coupling device 30 is also provided with a fixed annular frustoconical bearing surface 44, supported by the end 26 of the gearbox case and coaxial with primary shaft 14, which passes therethrough. Annular frustoconical bearing surface 44 is disposed facing first annular frustoconical bearing surface 36 of contact wheel 32.

Coupling device 30 is also provided, facing second annular frustoconical bearing surface 38 of contact wheel 32, with an annular frustoconical bearing surface 46, which is supported by toothed wheel 42 and consequently is coaxial with primary shaft 14.

In this way, contact wheel 32 of the coupling device is, in an intermediate rest position illustrated in FIG. 1, disposed axially between annular frustoconical bearing surfaces 44 of end 26 of the gearbox case and 46 of toothed gear 42, but is not in contact with the said regions.

In fact, gearbox 10 illustrated in FIG. 1 is in a neutral position in which idler pinion 22 of primary shaft 14 is not interlocked with fixed pinion 24 of secondary shaft 16. This configuration corresponds to a state in which the vehicle is stopped or is in an intermediate state in which another idler pinion (not illustrated) supported by primary shaft 14 is interlocked on the primary shaft and in which idler pinion 22, for example, will subsequently be interlocked on primary shaft 14 to engage a different gear reduction ratio.

In this state, contact wheel 32 occupies an intermediate position along splines 34 in which it does not cooperate with any of the elements of coupling device 30. Toothed gear 42 is then driven at a speed proportional to that of wheel 18 by the fact of its engagement with toothed gear 40 of the secondary shaft and of transmission 20.

Figure 2:
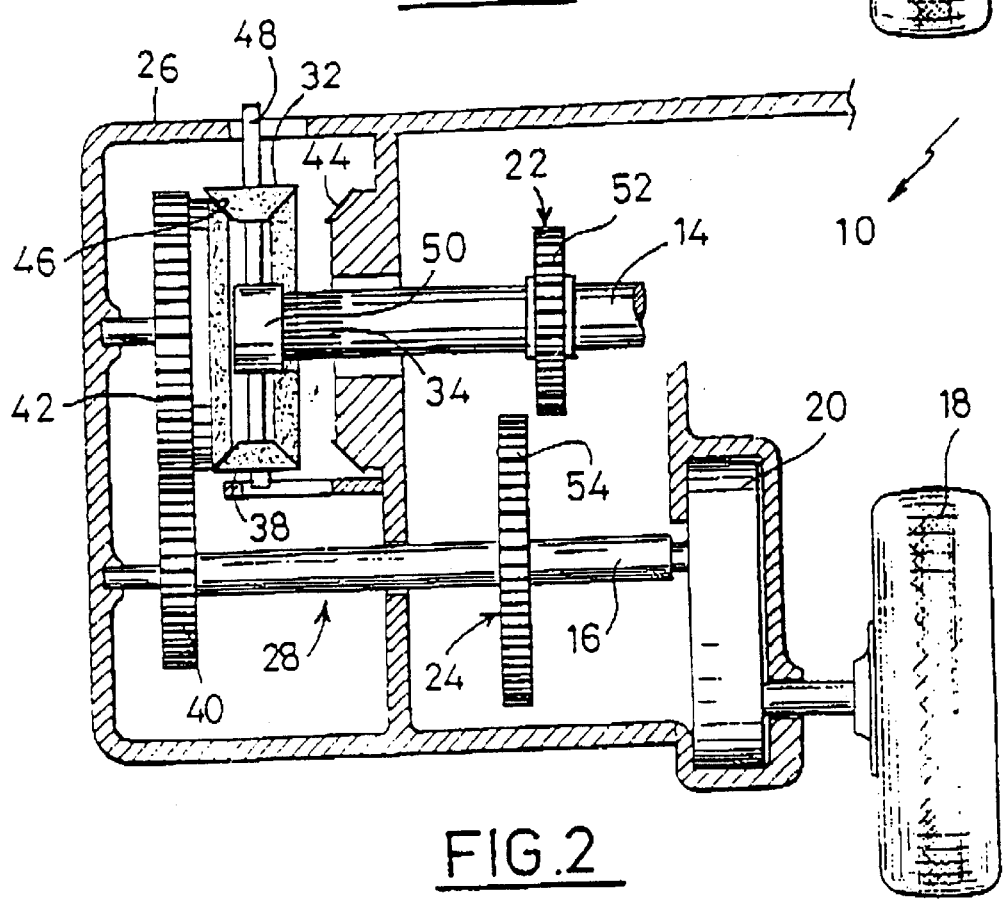
FIG. 2 is a view similar to FIG. 1, the coupling device being illustrated in an active mode of acceleration of the primary shaft.

The view of FIG. 2 illustrates a state in which secondary shaft 16 is turning at substantially greater speed than primary shaft 14. In this state the vehicle operator has released the aforesaid idler pinion (not illustrated), declutched and initiated engagement of the gear reduction ratio corresponding to idler pinion 22. Primary shaft 14 slows, while the secondary shaft is driven by wheel 18 of the vehicle.

In this case, to achieve interlocking of idler pinion 22 on primary shaft 14 and to cause it to engage with fixed pinion 24 of secondary shaft 16, by sliding its hub 50 longitudinally along shaft 14, it is necessary to bring it beforehand to a sufficiently high speed of rotation that teeth 52 of idler pinion 22 and 54 of fixed pinion 24 can cooperate noiselessly.

For this purpose, controlled sliding gear wheel 48 first moves hub 50 of contact wheel 32 toward the left, such that its annular frustoconical bearing surface 38 cooperates by friction with annular frustoconical bearing surface 46 of toothed gear 42. In this way, contact wheel 32 is driven in slipping rotation by toothed gear 42, the speed of which is linked to that of secondary shaft 16. Contact wheel 32 then drives primary shaft 14 via splines 34, and brings it progressively to a speed of rotation sufficient to permit interlocking of idler pinion 22 on shaft 14 to engage with fixed pinion 24 of secondary shaft 16, as will ultimately be seen with reference to FIG. 4.

Figure 3:
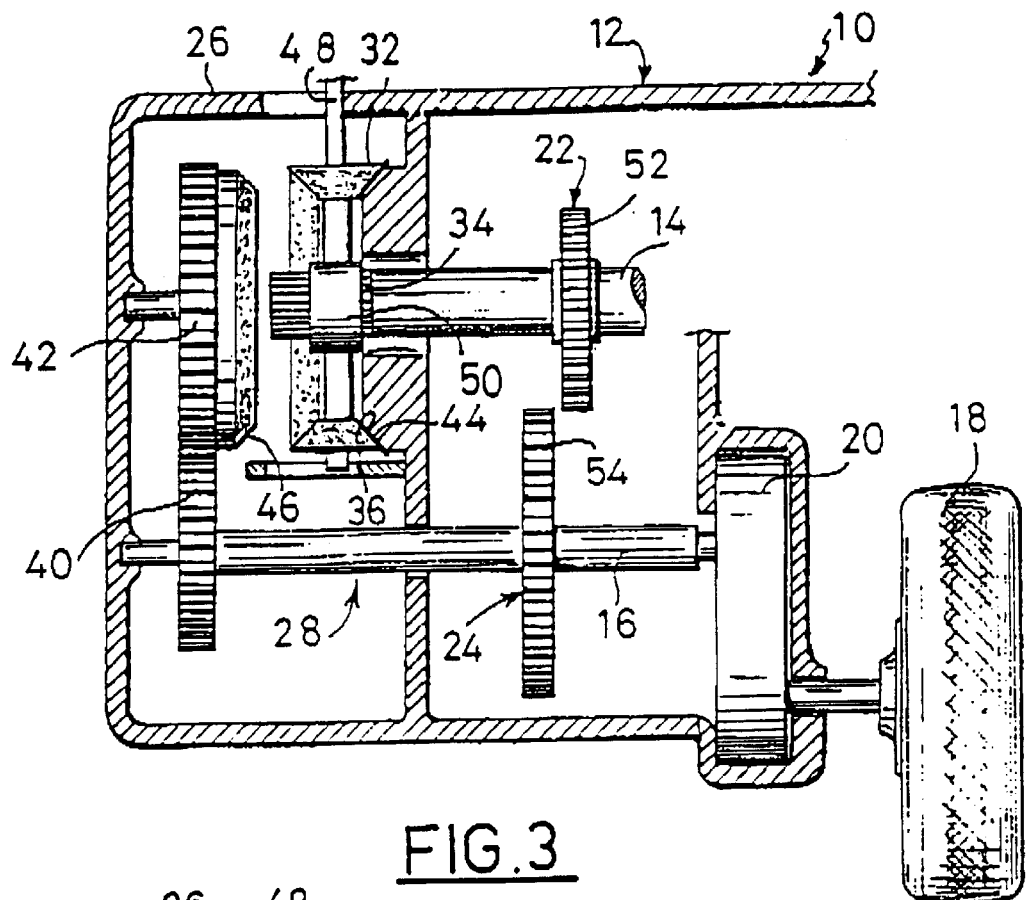
FIG. 3 is a view similar to FIG. 1, the coupling device being illustrated in an active mode of braking of the primary shaft.

The configuration described with reference to FIG. 3 illustrates the case in which primary shaft 14 is turning at substantially greater speed than secondary shaft 16.

To achieve interlocking of idler pinion 22 and to permit engagement of idler pinion 22 with fixed pinion 24, it is necessary to brake primary shaft 14. This operation is performed by moving sliding gear wheel 48 axially toward the right, such that annular frustoconical bearing surface 36 of contact wheel 32 cooperates by slipping friction with fixed annular frustoconical bearing surface 44 of end 26 of the gearbox case. In this way, a braking torque is applied to hub 50 of contact wheel 32, and it progressively brakes primary shaft 14, thus permitting interlocking of pinion 22 and engagement thereof with fixed pinion 24, as described with reference to FIG. 4.

Figure 4:
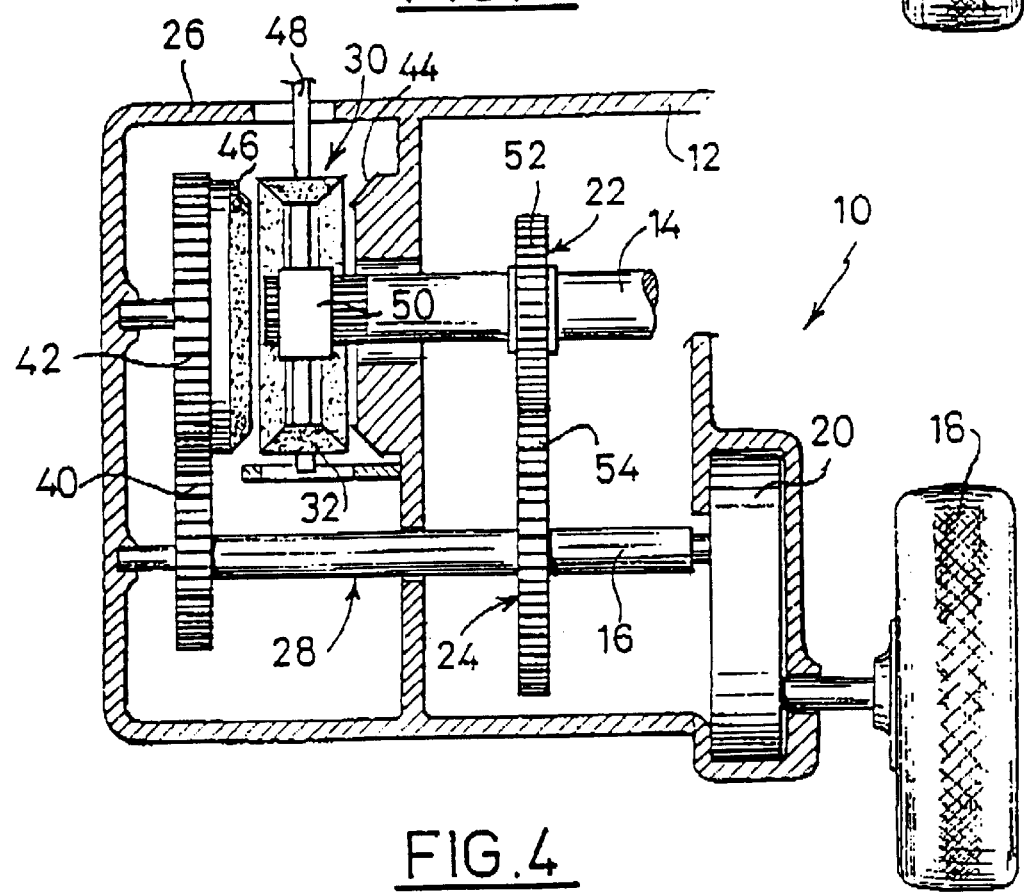
FIG. 4 is a view similar to FIG. 1, the idler pinion being interlocked and the coupling device being illustrated in an inactive mode.

FIG. 4 illustrates the last phase of interlocking of idler pinion 22 on primary shaft 14 in such a way that it engages with fixed pinion 24 of secondary shaft 16.

In this configuration, primary shaft 14 has been brought to an adequate speed of rotation via coupling device 30. Sliding gear wheel 48 of coupling device 30 is then driven in such a way that contact wheel 32 once again occupies, as described with reference to FIG. 1, an intermediate rest position between annular frustoconical bearing surfaces 46 of toothed gear 42 and fixed frustoconical bearing surface 44 of end 26 of the gearbox case.

The primary shaft then turns, by virtue of its inertia, at an adequate speed, and a device (not illustrated) moves idler pinion 22 axially toward the left in such a way that it is brought integrally into rotation with primary shaft 14 and that its teeth 52 engage with teeth 54 of the fixed pinion of secondary shaft 16, thus permitting transmission of the motive power originating from the engine (not illustrated) to secondary shaft 16 to drive the vehicle.

This embodiment is particularly advantageous, since it permits simple synchronization of primary shaft 14 with secondary shaft 16 to be achieved.

Thus, a single device 28, situated at the end of gearbox 12, for example, or in another place of gearbox 12, permits synchronization of all of the idler pinions of the gearbox to be achieved. In fact, such a device is applicable both to idler pinion 22 of primary shaft 14 (as has been described) and to idler pinions that would be supported by the secondary shaft, since the nature of the operation performed by device 28 is synchronization of the speeds of the primary and secondary shafts to correspond closely to the chosen gear reduction ratio.

Device 28 also permits the compactness and weight of the gearbox to be greatly influenced, since the conventional synchronizer devices associated with each idler pinion become superfluous. In fact, a single device 28 controls all synchronization operations of the gearbox via an appropriate logical control unit, which adequately directs the movements of contact wheel 32 via sliding gear wheel 48.

Figure 5:
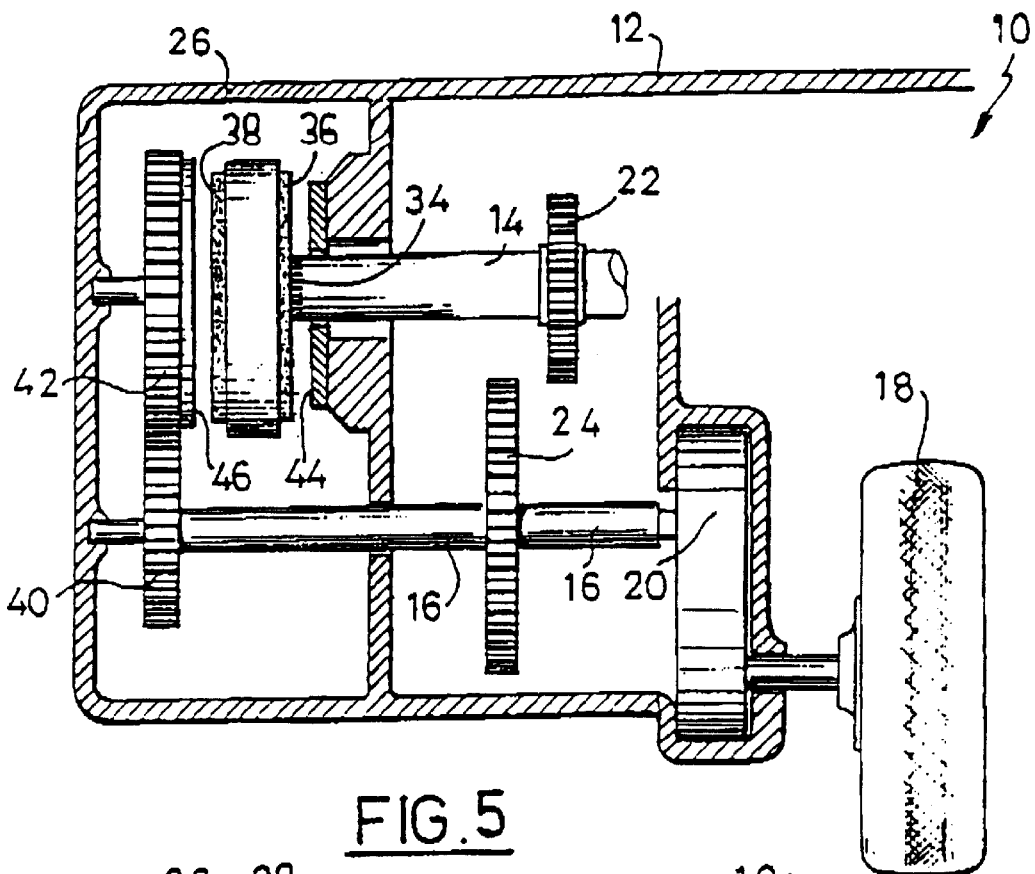
FIG. 5 is a schematic view in section through a longitudinal central plane of a gearbox constructed according to a variant of the invention and provided with a device for coupling by friction clutch.

FIG. 5 illustrates an alternative embodiment of the invention. In this embodiment, the operating principle of controlled declutchable means 28 is similar to that described with reference to FIGS. 1 to 4, but the cooperating surfaces are substantially different. Coupling device 30 in this case comprises a friction clutch, contact wheel 32 comprising a clutch disk covered on its two faces with friction lining, plane annular bearing surfaces 44 of end 26 of the case and 46 of toothed gear 42 being plates, made of ground steel, for example.

In fact, contact wheel 32 is provided with two plane annular bearing surfaces 38 and 36 designed to cooperate with complementary plane annular bearing surfaces 44 and 46. Such a design favorably influences the manufacturing costs, since it eliminates the need for construction of frustoconical surfaces, which are generally costly to machine.

As an alternative (not illustrated), the clutch comprising coupling device 30 can advantageously comprise an electromagnetic clutch in which contact wheel 32 comprises a rotor and in which toothed gear 42 and end 26 of the gearbox case are each provided with a cage coaxial with primary shaft 14, these cages being able to be traversed by an electromagnetic flux, which drives the rotor formed by wheel 32. The two radial cages are supported respectively by the first toothed gear (42) and by the fixed bearing surface (44) of the case (12) of the gearbox (10), and are capable of cooperating selectively in a slipping manner with two ends of the wheel (32), which forms a rotor in two portions and which is integral with the primary shaft (14) to accelerate or brake respectively the primary shaft (14) when a magnetic flux is established between a portion of the wheel (32) forming a rotor and a cage of the clutch.

The electromagnetic clutch under consideration can also be a powder-type electromagnetic clutch, the electrical power consumed by such a device then being much smaller than that consumed by a conventional electromagnetic clutch. Such a device has the advantage that it can be controlled simply by a logical control unit, which ensures synchronization of primary shaft 14 with secondary shaft 16.

Figure 6:
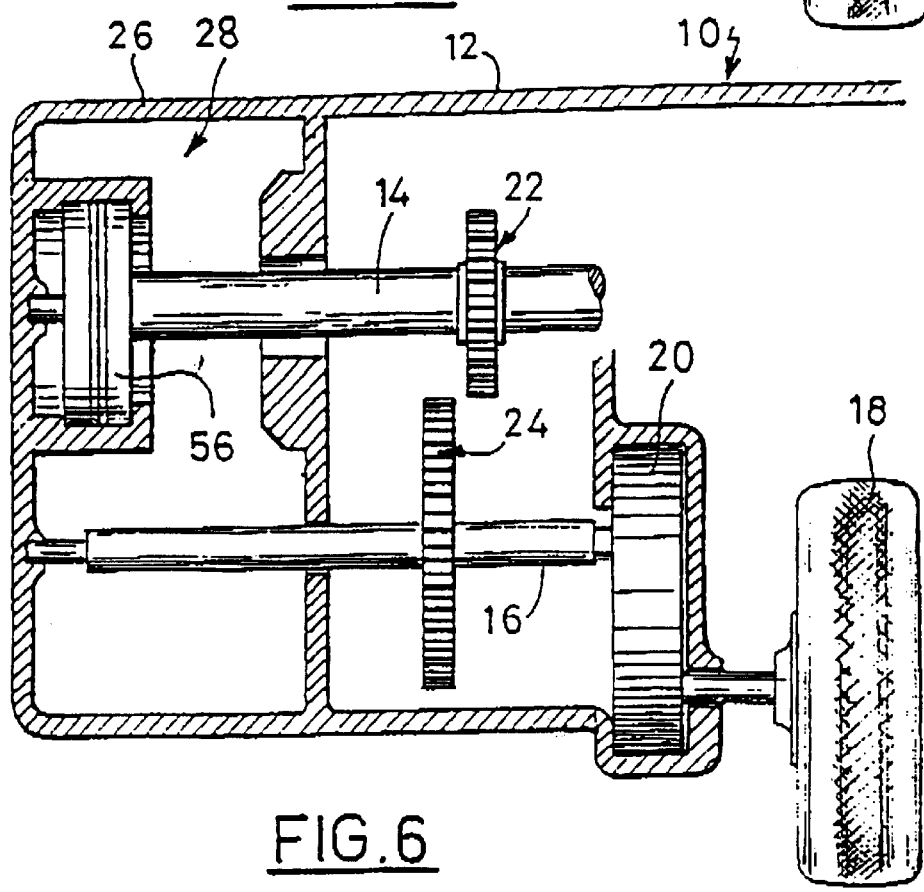
FIG. 6 is a schematic view in section through a longitudinal central plane of a gearbox constructed according to another variant of the invention and provided with a device for coupling by electromagnetic clutch.

FIG. 6 illustrates a final embodiment of the invention in which controlled declutchable means 28 are provided with a motorized pump 56, which is disposed at end 26 of the gearbox case and which is linked in rotation to primary shaft 14. In this configuration, declutchable means 28 receive power not from secondary shaft 16 but from the engine which, for example, supplies a hydraulic compressor. Motorized pump 56 is provided, for example, with axial pistons (not illustrated), and it can operate selectively as a hydraulic motor to accelerate primary shaft 14 or as a hydraulic pump to brake primary shaft 14.

This variant is particularly advantageous, since it permits synchronization of primary shaft 14 with secondary shaft 16 to be achieved by hydraulic means, the power of which is furnished, for example, by a hydraulic compressor supplied by the vehicle engine. Such declutchable means can therefore be controlled by an extremely simplified logical control unit involving very few electronic components. These declutchable means are particularly suitable to an automatic robotized gearbox in which the hydraulic control unit generally has a predominant place. Such a robotized gearbox can include automatic control means acting on the declutchable means for acceleration and braking of the primary shaft (14), and automated means for interlocking of the idler pinions (22).

What is claimed is:

1. A motor vehicle gearbox comprising:

a gearbox case;

a primary shaft having an idler pinion mounted thereon;

a secondary shaft provided parallel to said primary shaft, said secondary shaft being linked to at least one wheel, said secondary shaft having a second fixed pinion mounted thereon, said idler pinion and said second fixed pinion being configured to engage one another in order to transfer power from said primary shaft to said secondary shaft; and means for synchronizing a rotational speed of said idler pinion with a rotational speed of said second fixed pinion for facilitating engagement thereof, said means for synchronizing comprising a device selectively permitting a rotational speed of said primary shaft to be increased or decreased in order to facilitate engagement of said idler pinion with said second fixed pinion, said device comprising means for temporarily linking said primary shaft in slipping rotation to said gearbox case, wherein said device further comprises means for temporarily linking said primary shaft in slipping rotation to said secondary shaft.

2. A gearbox according to claim 1, characterized in that the means for temporarily linking the primary shaft in slipping rotation to the secondary shaft are provided with a first toothed gear coaxial with the primary shaft, which engages with a second toothed gear, which is supported by the secondary shaft and linked in rotation thereto, and which is capable of being temporarily linked in rotation to the primary shaft via a slipping device for coupling of acceleration.

3. A gearbox according to claim 2, characterized in that the means for linking the primary shaft in slipping rotation to the gearbox case are provided with a fixed annular bearing surface of the gearbox case, coaxial with the primary shaft, to which the primary shaft can be linked temporarily via a slipping device for coupling of braking.

4. A gearbox according to claim 3, characterized in that the slipping device for coupling of acceleration and the slipping device for coupling of braking are provided with a common contact wheel, which is linked in rotation to primary shaft by splines, which is provided with two oppositely disposed annular bearing surfaces, and which is capable of being driven slidingly along the primary shaft, toward a first active extreme axial position in which a first annular bearing surface cooperates by friction with a complementary annular bearing surface of the said first toothed gear, to accelerate the primary shaft, or toward a second, opposite active extreme axial position in which a second annular bearing surface cooperates by friction with the fixed, annular bearing surface of the gearbox case, to brake the primary shaft, by passing through an indexed intermediate axial rest position.

5. A gearbox according to claim 4, characterized in that the annular bearing surfaces are frustoconical.

6. A gearbox according to claim 4, characterized in that the annular bearing surfaces are plane, and in that the contact wheel is a clutch disk covered with a friction lining material.

* * * * *